BEST AVAILABLE COPY
KEECH & STILWELL.
Grain Winnower.
No. 169. A. I. Patented July 7, 1857.
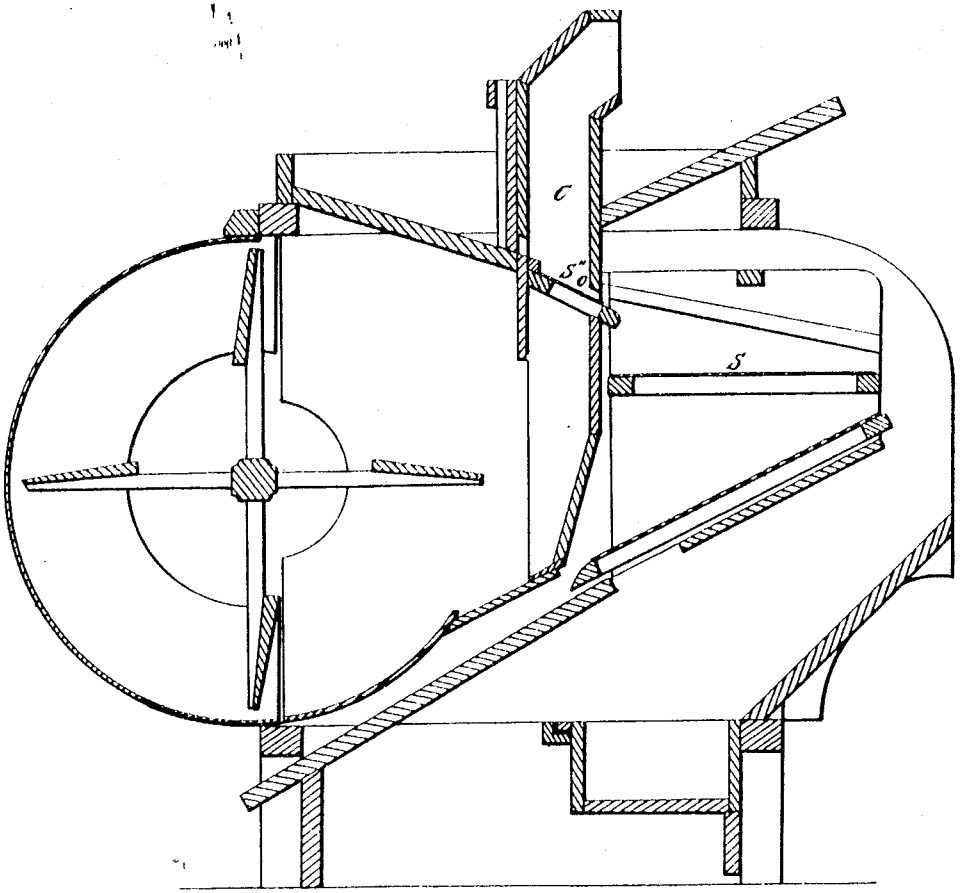
N. PETERS, Photo-Lithographer, Washington, D. C.

BEST AVAILABLE COPY
KEECH & STILWELL.
Grain Winnower.
No. 169. A. I. Patented July 7, 1857.
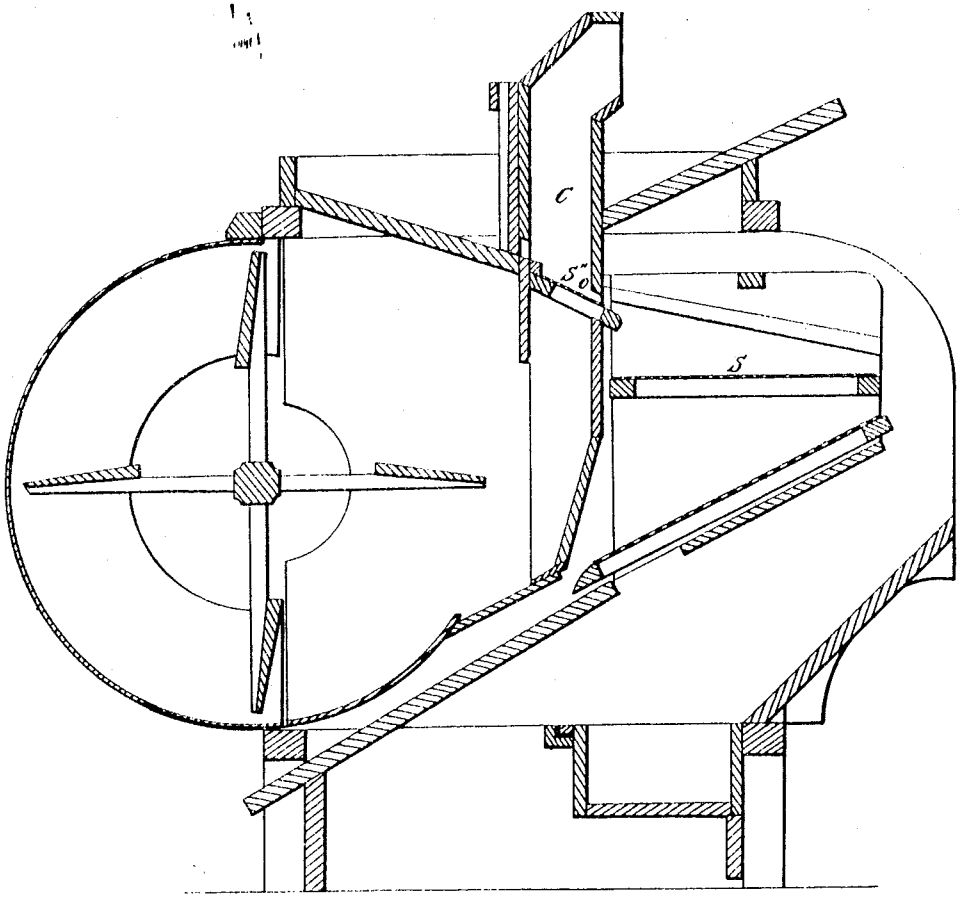
N. PETERS, Photo-Lithographer, Washington, D. C.